United States Patent [19]

Kirchoff

[11] 4,191,387

[45] Mar. 4, 1980

[54] WATERTIGHT SEAL FOR TOGGLE SWITCHES

[75] Inventor: Francis D. Kirchoff, Waban, Mass.

[73] Assignee: Alco Electronic Products, Inc., North Andover, Mass.

[21] Appl. No.: 971,801

[22] Filed: Dec. 21, 1978

[51] Int. Cl.$^2$ .......................... H01H 3/06; F16J 15/18

[52] U.S. Cl. .................................... 277/30; 200/67 G; 200/302; 200/335

[58] Field of Search ............... 200/67 G, 68, 302, 335; 277/12, 30, 31, 33, 144, 165

[56] References Cited

U.S. PATENT DOCUMENTS

| | | | |
|---|---|---|---|
| 2,650,964 | 9/1953 | Razdow | 200/302 X |
| 3,636,286 | 1/1972 | Hults | 200/67 G X |
| 3,721,453 | 3/1973 | Likavec | 277/30 |
| 3,988,558 | 10/1976 | Josemans et al. | 200/335 |

FOREIGN PATENT DOCUMENTS

| | | | |
|---|---|---|---|
| 748748 | 5/1956 | United Kingdom | 200/67 G |
| 1140064 | 1/1969 | United Kingdom | 200/302 |

*Primary Examiner*—Robert S. Ward, Jr.
*Attorney, Agent, or Firm*—Pearson & Pearson

[57] ABSTRACT

A toggle switch of the type used on the casing of a camera or intercom device solves the problem of moisture entering the casing through the switch to thereby damage the electronic circuitry, cause rust, mildew and other damage. The exterior of the switch housing is watertight by reason of a turn nut compressing an O ring. The interior of the toggle switch handle housing is made watertight, while still permitting toggle motion, by an elongated seal of solid cross section engaging the outer face of the bulbous portion of the handle and a second elongated seal of solid cross section engaging the inner face of the bulbous portion.

10 Claims, 1 Drawing Figure

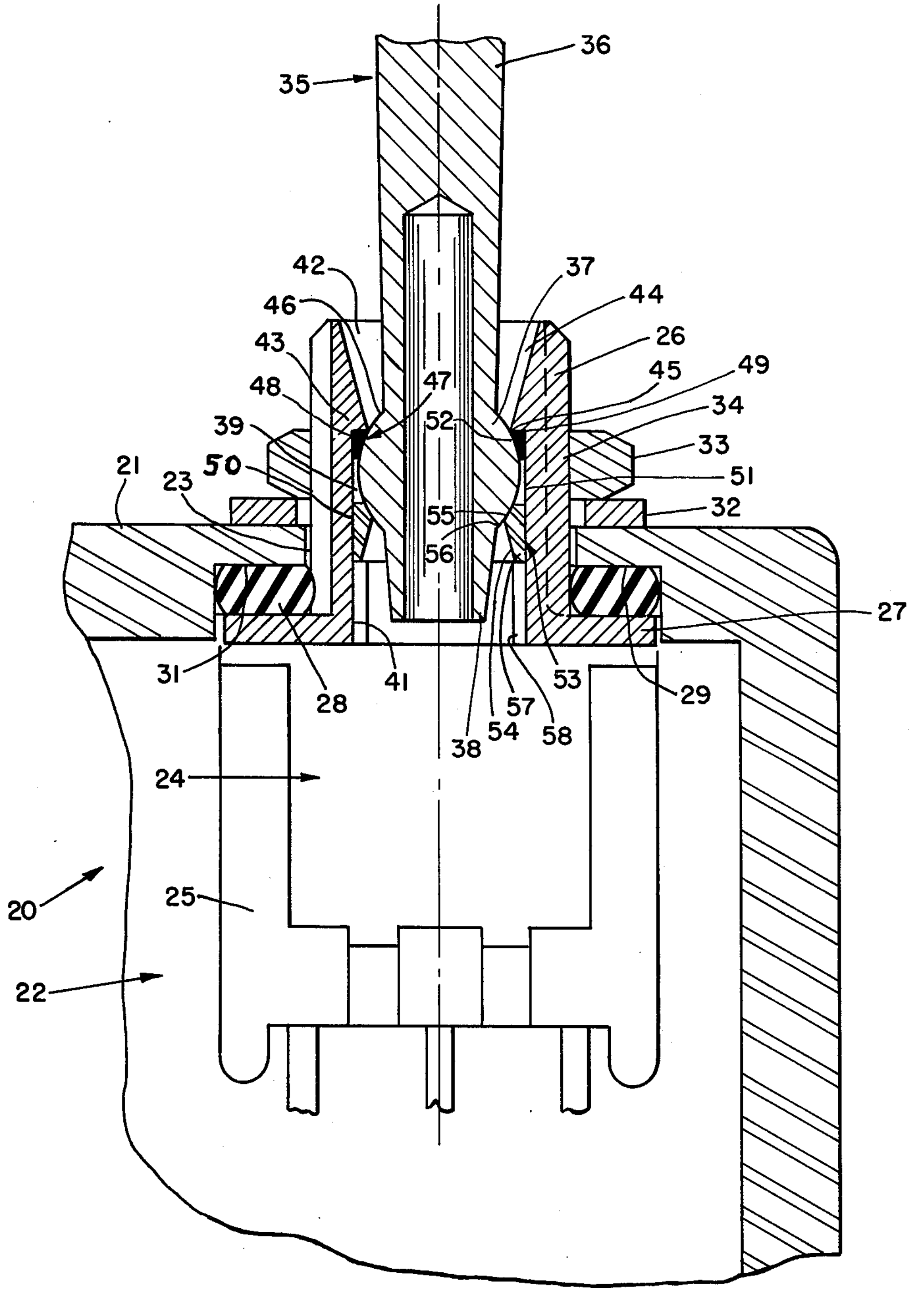
36
35
42
37
44
46
26
43
45
49
47
48
34
52
39
33
50
51
21
23
55
32
56
27
31
41
53
29
28
57
58
54
38
24
20
25
22

WATERTIGHT SEAL FOR TOGGLE SWITCHES

BACKGROUND OF THE INVENTION

It has been found that when a paging device is used on the golf course, or when a camera is used outdoors, and a rainstorm occurs the seal of the actuating switch of the instrument has tended to leak water into the inside even though the rest of the instrument is tightly sealed. If a conventional O ring seal is mounted around the toggle handle of a toggle switch, it is usually only at the top, or outer, part of the handle so that when the toggle handle is moved it compresses one side of the O ring but releases pressure on the opposite side, loosening the O ring away from its seat and enabling water, or moisture to enter the device. Most conventional O ring seals used in the switches of cameras, citizen band radios, paging devices and the like will withstand only about two inches of hydraulic head and will admit moisture into the device at any greater hydraulic head.

SUMMARY OF THIS INVENTION

The watertight seal of this invention is designed to seal the toggle handle of a toggle switch of an electric, or electronic, device to withstand an hydraulic head of one hundred eighty inches or more. A first, or outer, annular seal of elongated, relatively flat solid cross section and of elastomeric material such as silicone is firmly seated against a shoulder within the recess which receives the bulbous portion of the toggle handle. The edge of the shoulder and the elongated, curved face of the first seal intimately and slidably contact the outer circumferential face of the bulbous portion to permit handle movement but with predetermined squeezing and compression of the seal over a large area to thereby prevent passage of moisture.

A second, or inner, elongated annular seal of solid cross section and preferably of polyamide material intimately and slidably contacts the inner circumferential surface of the bulbous portion of the handle to form a second line of defense against entry of moisture into the switch and hence into the device. The second annular seal is held in place by the friction of its outer wall with the inner wall of the cylindrical recess receiving the bulbous portion.

In addition a hollow, cylindrical member, which may be split and of resilient metal, is sleeved within the inner end of the hollow, cylindrical recess of the toggle handle housing to not only hold the second annular seal, bulbous portion of the handle and the first annular seal in position within the recess but also to apply pressure thereon to compress the seals a predetermined amount.

BRIEF DESCRIPTION OF THE DRAWING

The single FIGURE of the drawing is a front elevation in half section showing the watertight seal for the toggle handle of a toggle switch, the switch being shown fragmentarily as it is itself tightly sealed in a wall of a portable electronic device.

DESCRIPTION OF A PREFERRED EMBODIMENT

As shown fragmentarily in the drawing a typical camera, paging device radio or the like 20, includes a wall 21, an interior 22, and an opening 23 in wall 21 for a toggle switch 24.

The toggle switch 24 has a conventional casing 25, located within interior 22 and a ball housing 26, with an annular flange 27, the housing 26 extending out through opening 23 in wall 21.

The switch 24 is tightly sealed, and watertight, by reason of the O ring 28 being compressed into the flattened condition shown, between the flange 27 and the bottom 29 of the recess 31 in opening 23 in wall 21. The compression is obtained by lock washer 32 and nut 33, threadingly affixed around the exterior 34 of ball housing 26.

The toggle handle 35 has an elongated handle portion, or finger grip 36, a ball, or bulbous, portion 37 of generally spherical configuration, and an inner stem 38 which contacts the rocker arm, see-saw, or other actuation mechanism of the switch, not shown, well known and forming no part of this invention.

The ball housing 26 includes an inner cylindrical recess 39, an open inner end 41, an open outer end 42 and an annular, inward-projecting shoulder 43. The inside diameter of shoulder 43 is less than the outside diameter of the bulbous portion 37, while the inside diameter of the cylindrical recess 39 is greater than the outside diameter of bulbous portion 37 so that the portion 37 is captive in, but loosely received in, the recess 39.

Preferably a recess 44, of truncated conical configuration, extends from the open outer end 42 to the shoulder 43, to provide space for toggle action of handle 36 and also to form a sharp annular edge 45 on shoulder 43. Thus the sharp annular edge 45 has only line contact with the outer circumferential surface 46 of the ball 37.

First, or outer, annular seal means 47 comprises a first annular seal 48 of elongated, relatively flat configuration, and of solid cross section, firmly seated against and abutting the right angular corner 49 formed by shoulder 43 and the inner wall 51 of recess 39. First annular seal 48 is elastomeric and preferably of silicone so that it is elongated, or broad arcuate surface 52 intimately and slidably engages a correspondingly large area of the outer circumferential face 46 of ball 37 to prevent the passage of moisture.

Second, or inner, annular seal means 53 comprises a second annular seal 54 of elongated, relatively flat configuration, and of solid cross section. Second annular seal 54 is preferably of polyamide material and includes an elongated, broad arcuate surface 55, intimately and slidably engaging a correspondingly large area of the inner circumferential surface 56 of the ball 37. Second annular seal 54 also includes an elongated skirt portion 57, which is of truncated conical conconfiguration to permit toggle action of stem 38 while providing an outer wall 50 of considerable area for frictional contact with the wall 51 of recess 39. The second seal 54 thus also bears against the ball 37 to prevent the passage of moisture regardless of the tilt of handle 35.

Preferably a sleeve 58, which may be split and resilient, or may be unsplit and press fitted, is inserted in the open end of the recess 39 under predetermined pressure to apply pressure on the annular seals to thereby obtain a watertight fit which still enables easy actuation of the toggle handle 35.

I claim:

1. A watertight seal for a toggle switch of the type having an elongated, toggle switch handle with an integral, generally spherical, portion of predetermined diameter, intermediate of the length thereof said seal comprising:

an elongated hollow housing having an open upper end, an open lower end, an annular, inward-projecting shoulder, intermediate of said ends, of less diameter than said spherical portion and a cylindrical recess of greater diameter than said spherical portion extending from said open, lower end to said shoulder;

said spherical portion having an outer circumferential face in sliding contact with said annular shoulder;

a first annular seal, of flexible resilient material, seated within said cylindrical recess and juxtaposed to said shoulder said seal being in sliding contact with the outer circumferential face of said spherical portion and a second annular seal, of flexible resilient material, mounted within said cylindrical recess, and in sliding contact with the inner circumferential face of said spherical portion;

said first and second annular seals permitting actuation of said toggle handle while preventing passage of moisture around said handle.

2. A watertight seal as specified in claim 1 wherein: said first annular seal is of solid, elongated cross section.

3. A watertight seal as specified in claim 1 wherein: said first annular seal is of solid, elongated cross section and formed of silicone elastomer material.

4. A watertight seal as specified in claim 1 wherein: said second annular seal is of solid elongated cross section and formed of polyamide material.

5. A watertight seal as specified in claim 1 wherein: said first and second annular seals are spaced a predetermined distance apart and each is of elongated, solid cross section.

6. A watertight seal as specified in claim 1 wherein: said elongated hollow housing includes an interior face of truncated conical configuration, extending from said open end to said shoulder.

7. A watertight seal as specified in claim 6 wherein: said truncated conical face forms a sharp tapered edge with said shoulder so that said shoulder engages the outer circumferential face of said spherical portion with line contact only.

8. A watertight seal as specified in claim 1 wherein said housing includes a hollow cylindrical metal ring sleeved within said open lower end and abutting said second annular seal for retaining said seal in position.

9. A watertight seal for the bulbous portion of a toggle switch handle, said seal comprising:

a housing having an elongated, cylindrical recess for receiving the said bulbous portion of said handle, said housing having an inward projecting annular shoulder, of less interior diameter than the exterior diameter of said bulbous portion in intimate slidable contact therewith;

a first annular seal of elastomeric material and elongated solid cross section, seated against said shoulder and in slidable contact with the outer circumferential face of said bulbous portion and a second annular seal of elastomeric material and elongated, solid cross section, located within said cylindrical recess and in slidable contact with the inner circumferential face of said bulbous portion;

said first and second annular seals permitting toggle action of said handle while preventing moisture from entering a switch through said housing.

10. A watertight seal as specified in claim 9 wherein: said housing includes means for affixing said second annular seal within said cylindrical recess.

* * * * *